3,384,634
PURIFYING ESTERS OF POLYHYDRIC
ALCOHOLS
Charles J. O'Boyle, Gramercy, La., assignor to North American Sugar Industries Incorporated, New York, N.Y., a corporation of New Jersey
No Drawing. Continuation-in-part of applications Ser. No. 33,116, June 1, 1960, and Ser. No. 263,349, Mar. 6, 1963. This application July 13, 1964, Ser. No. 382,393
15 Claims. (Cl. 260—234)

ABSTRACT OF THE DISCLOSURE

The specification discloses a method for removing extraneous solvents from mixtures containing polyhydric alcohol esters. The mixture is dispersed in a wash solvent in which the extraneous solvent is soluble and the ester is of limited solubility. The wash solvents disclosed are alkane hydrocarbons having a boiling point between about −45° C. and 115° C., at atmospheric pressure. Methods for the preparation and preliminary purification of the polyhydric alcohol esters are also described.

---

This invention relates to a process for refining esters of polyhydric alcohols and in particular it is concerned with a method for removing certain solvents which may be mixed with the esters of polyhydric alcohols as impurities.

This application is a continuation-in-part of application Ser. No. 263,349, now U.S. Patent No. 3,141,013, issued July 14, 1964, and application Ser. No. 33,116, filed June 1, 1960, now U.S. Patent No. 3,141,012, issued July 14, 1964.

The invention provides improvements and procedures for the preparation of the esters of solid polyhydric alcohols by which an ester product containing acceptably small amounts of processing solvents may be obtained.

The esters of solid polyhydric alcohols which are to be purified within the scope of this invention are useful as chemical intermediates and surface-active agents. As chemical intermediates, they are useful in the preparation of synthetic resins, waxes, drying oils, and lubricants. As surface-active agents, they are useful as emulsifiers, solubilizers, dispersing and wetting agents, textile processing assistants, and ingredients in detergents, cosmetics, pharmaceuticals and foods.

Ester compositions of the type sought to be made and purified have found only limited commercial use, in spite of their value in the applications mentioned above, because of difficulties which have been experienced in isolating and refining them after they have been synthesized.

The ester products described above are generally made by a transesterification reaction between a polyhydric alcohol and an ester (for example, a methyl ester or triglyceride fat) as represented by the equation:

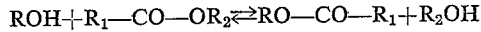

$$ROH + R_1-CO-OR_2 \rightleftarrows RO-CO-R_1 + R_2OH$$

where R represents the residue of the polyhydric alcohol, $R_1$—CO represents the acyl moiety of the ester reagent, and $R_2$ represents the residue of the alcohol moiety of the ester reagent.

The ester products which are within the scope of this invention are ones which contain substantial amounts of monoesterified polyhydric alcohol. In order to obtain these products it is necessary to use a large amount of polyhydric alcohol in the reaction mixture and to have an excess of unreacted polyhydric alcohol in the reaction mass at the end of the synthesis.

To carry out the reaction effectively one or more solvents are required at various stages of the process. Reaction solvents, also referred to as primary solvents, are required in order to get the reagents in the same phase so that the reaction may proceed at a satisfactory rate. To minimize side reactions in the synthesis of esters, moderate temperatures are generally required. Such moderate temperatures further enhance the need for reaction solvents to dissolve the polyhydric alcohol and ester reagents.

The unreacted polyhydric alcohol remaining after the reaction may be separated from the reaction mass by adding another solvent to the reaction mass, known as a secondary solvent, which selectively precipitates the unreacted polyhydric alcohol. Such a process is disclosed and claimed in my copending U.S. Patent No. 3,141,012. The liquor recovered after precipitation is usually distilled to remove most of the secondary or precipitating solvent from the crude product.

In addition to, or in substitution for, the foregoing precipitation step, the crude reaction product may be processed in other ways, including the purification processes described in United States Patent No. 2,893,990. Such steps may introduce processing solvents in addition to the primary reaction solvent.

It is generally desirable to remove as completely as possible the primary and secondary and other processing solvents used in connection with the foregoing procedures, since some of these processing solvents are toxic, or irritating to the eyes and/or skin, and others, even though non-toxic, impart an undesirable odor or flavor to the product.

Furthermore, recovery of the processing solvents is important from an economic standpoint. The solvents required, particularly the reaction solvents, are relatively expensive, and since they add no value to the products, substantially complete solvent recovery is desirable to make the process economically attractive.

As described in my copending United States Patent No. 3,141,013, processing solvents of the foregoing description may be removed by distillation of the reaction mass containing the polyhydric alcohol ester in the presence of oxygenated polar solvents which are referred to as "fluxing agents." These oxygenated solvents make it possible to distill the processing solvents to low concentrations, so that their presence will not be objectionable.

However, because the fluxing agents are frequently solvents of relatively low volatility, such as ethylene glycoldipropionate and triacetin, it may be impractical to remove completely the fluxing agent by distillation. Thus, for instance, a typical polyhydric alcohol ester may be distilled in the presence of a fluxing agent to remove processing solvents and the distillation continued under vacuum until the mass has a temperature of 100°–125° C. at a vacuum of less than 1 mm. Hg pressure. Under these stripping conditions products containing up to 10% of the fluxing agent are often obtained. In other cases even higher concentrations of fluxing agents, i.e. up to 20% or more may remain in the product. In some applications, concentrations of the fluxing agent of up to 10% or more may be undesirable.

Accordingly, it is an object of this invention to provide a method for reducing the concentration of fluxing agents in polyhydric alcohol ester products.

While this invention contemplates generally the separation of polyhydric alcohol esters and some of the solvents described in my United States Patent No. 3,141,013 mentioned above, for whatever reasons such agents may be admixed with the ester, it is a particular object of this invention to provide a method of improving the purified ester products which are obtained by practicing the process described and claimed in said United States patent.

These and other objects are realized by washing a polyhydric alcohol ester containing certain fluxing agent impurities (which are described more particularly below) with a wash solvent which is an alkane hydrocarbon solvent with a boiling point below about 115° C. Generally, the ratio of the wash solvent to polyhydric alcohol ester will be in the range of about 0.8/1 to 10/1. The ester product is agitated with the wash solvent to thoroughly contact the former with the latter. Thereafter the mixture of ester product and wash solvent is separated into an ester-rich phase and a solvent-rich phase, and at least a portion of the solvent-rich phase is removed.

The success of the present invention depends upon the discovery that the wash solvents are miscible with certain of the fluxing agents to a sufficient degree to extract the fluxing agents while, at the same time, the polyhydric alcohol ester product is substantially undissolved.

More specifically, in the process to which the present invention is applicable, esters of solid polyhydric alcohols are prepared by reacting the solid polyhydric alcohol in a transesterification reaction with an ester of an alcohol and a carboxylic acid under conditions to form esters of the solid polyhydric alcohol with the acid and to release the alcohol. The reaction is carried out in the presence of a primary solvent and an alkaline catalyst for the reaction, and preferably utilizes a large excess of solid polyhydric alcohol to promote formation of a large proportion of monoesterified solid polyhydric alcohol.

Generally, the solid polyhydric alcohols which may be employed in the manufacture of esters applicable to the present invention are the polyhydric aliphatic alcohols that have at least four free hydroxyl groups, 4 to 18 carbon atoms, and have a melting point of at least about 85° C. They should also be free of groups which interfere with the transesterification reaction. Specific illustrative alcohols include the non-reducing oligosaccharides such as sucrose and raffinose, pentaerythritol, dipentaerythritol, tripentaerythritol, xylitol, sorbitol, mannitol, the lower alkyl glucosides and acetyl glucosamine, N-urea glucoside and N,N-urea diglucoside. Mixtures of the polyhydric alcohols can also be used. Such mixtures include mixtures of sucrose and raffinose obtained in the refining of beet sugar, mixtures of sorbitol and mannitol which are obtained by reduction of corn sugar and invert sugar, and mixtures of the various pentaerythritols which are obtained by the condensation of acetaldehyde and formaldehyde in the presence of alkaline catalysts.

The acid moiety of the polyhydric alcohol ester is derived from reactants which are esters of aliphatic alcohols, glycols and glycerines on the one hand, and mono-, di- and polycarboxylic acids having from 4 to about 32 carbon atoms on the other hand, the latter being free of groups which interfere with the transesterification reaction and containing no more than two oxygen atoms in addition to those in the carboxyl groups. Generally, appropriate esters are mentioned in my copending U.S. Patent No. 3,141,012. Typical ester reactants include, but are not limited to, tallow and other fats, cottonseed oil, coconut oil, oiticica and castor oils and other vegetable oils, marine oils such as fish and whale, esters of tall oil fatty acids, methyl esters of rosin acids, methyl esters of naphthenic esters derived from petroleum, methyl salicylate, the ester component of various vegetable waxes such as carnauba and sugar cane wax, ethyl stearate, methyl esters of dibasic acids such as dimethyl succinate, dimethyl fumarate, dimethyl maleate, dimethyl glutarate, dimethyl adipate, dimethyl azelate, dimethyl sebacate, methyl esters of di- and tri-basic acids which are obtained by polymerization of mixtures of mono-, di- and tri-unsaturated fatty acids, methyl esters of the tri- and polybasic acids which can be prepared by condensation of methyl esters of maleic and fumaric acids with the methyl esters of oleic, linoleic and other unsaturated fatty acids, ethyl esters of the tallow fatty acids, and mixtures of these esters.

Excellent results are generally obtained with refined mixed esters of saturated fatty acids such as the single, double and triple pressed grades of stearic acid of commerce. Mixtures consisting largely of arachidic and behenic acids derived from fish oils by hydrogenation and fractionation are another group of mixed acids particularly suitable for the present invention.

In addition to the foregoing mixtures of fatty acids, the ester component may be relatively pure, with respect to the acid component, e.g. esters of capric, lauric, myristic, palmitic, arachidic and lignoceric acids.

A number of primary reaction solvents may be used for the transesterification reaction. Useful primary solvents are described in detail in my above-mentioned United States Patent No. 3,141,012. Four groups are defined. These are briefly summarized as follows:

The first group consists of mono- and di-alkyl and alkoxy-alkyl amides of lower fatty acids, the amides containing from 3 to 8 carbon atoms. The group includes dimethyl formamide, dimethyl acetamide, N-n-amyl N-methyl formamide, N,N-di(methoxyethyl) formamide, N-methyl N-ethoxyethyl formamide, and N-methyl formamide.

The second group consists of amides of lower fatty acids in which the nitrogen forms part of a heterocyclic ring system. This group of primary solvents includes N-formyl morpholine, N-acetyl morpholine, N-propionyl morpholine, dimethyl N-formyl morpholine, N-formyl piperidine and N-acetyl piperidine.

The third group of primary solvents are tertiary amines having one, two or three alkoxy-alkyl radicals, and having less than 9 carbon atoms. Examples include dimethyl methoxyethyl amine, methyl dimethoxyethyl amine, dimethyl ethoxyethyl amine, methyl ethyl methoxyethyl amine, dimethyl 2-methoxypropyl amine and tri-(methoxyethyl) amine.

The fourth group of primary solvents are the N-alkyl pyrrolidones and caprolactams. Examples include N-methyl-2-pyrrolidone, N-butyl pyrrolidone, and N-methyl caprolactam.

Mixtures of the primary reaction solvents described above may also be used.

After the transesterification reaction has terminated, any reaction catalyst present should be deactivated if a product containing a high proportion of monoester is desired. If, as is customary, an alkaline catalyst is employed, the catalyst may be deactivated by the addition of an acid, such as those described in my United States Patent No. 3,141,013. As an alternative, the reaction mass may be maintained at the reaction temperature for a period of time sufficient to consume the alkaline catalyst by a saponification reaction.

After deactivating the catalyst, the reaction mass is subjected to one or more purification steps. It is these steps which introduce the fluxing agents which the present invention is adapted to remove.

As has already been mentioned, it is particularly contemplated that the fluxing agents will be added as a part of the fluxing process described in my aforementioned United States patent. Thus, as disclosed in that patent, the fluxing agent is incorporated into the crude reaction mass containing some residual primary reaction solvents. The mass, including the fluxing agent, is thereafter subjected to distillation to remove a substantial portion of the residual primary reaction solvent. Generally, distillation is carried out at a temperature below 140° C., and may be carried out under vacuum.

Depending on the volatility of the fluxing agent and the distillation conditions, the product resulting from the fluxing process may contain as little as 1% of the fluxing agent. However, it may not always be convenient or practical to strip the fluxing agent so completely from the ester product. Some fluxing agents may be too low in volatility to be removed conveniently by distillation. Moreover, even if the fluxing solvent is sufficiently volatile so that low concentrations could be obtained by distillation, it may be convenient not to do so in order to obtain thereby a relatively fluid product which can be handled more readily than a product which has been substantially freed of the fluxing agent.

The fluxing agent impurities which may be removed successfully by the present invention are one or more solvents selected from the group consisting of:

(a) Di-esters of the aliphatic diols having 2 to 6 carbon atoms with the lower fatty acids which have from 2 to 4 carbon atoms in the molecule. These materials include the di-esters of ethylene glycol, the propylene glycols, the butane diols, triethylene glycol, dipropylene glycol, and 2,2-dimethyl-1,3-butanediol with acetic, propionic, butyric, and isobutyric acids.

(b) Tri-esters of aliphatic triols having from 2 to 6 carbon atoms with the lower fatty acids which have from 2 to 4 carbon atoms in the molecule. These materials include esters of glycerine, the butane triols, 1,2,6-hexanetriol, with acetic propionic, butyric and isobutyric acids in which all of the hydroxyls of the triol are esterified.

(c) Di-esters of aliphatic di-carboxylic acids having from 4 to 6 carbon atoms with lower monohydric primary and secondary aliphatic alcohols, the esters having from 6 to 10 carbon atoms in the ester molecule. Suitable lower monohydric alcohols are those having from 1 to 4 carbon atoms in the molecule. Specific examples include the di-esters of methyl, ethyl, propyl or butyl alcohols with fumaric, maleic, succinic, adipic, and itaconic acids.

(d) Aconitic acid completely esterified with methyl or ethyl alcohol.

(e) Esters of acetoacetic acid and levulinic acid with the primary and secondary aliphatic monohydric alcohols which have from 1 to 5 carbon atoms. Typical esters would be the methyl, ethyl, propyl, butyl or amyl esters of acetoacetic acid or levulinic acid.

In the practice of this invention, it is generally desired that the primary reaction solvents described above should be in a low concentration, preferably not exceeding 20% based on the weight of the polyhydric alcohol ester. As has already been mentioned, the success of the present invention depends on employing a wash solvent system which will not dissolve any appreciable quantity of the polyhydric alcohol ester. The presence of significant amounts of reaction solvents may seriously interfere with this objective. More than about 20% of the reaction solvent will disperse or solubilize the polyhydric alcohol ester. This will make it difficult to subsequently separate the washed ester from the wash solvent.

It should be recognized, however, that it is not absolutely essential in all instances to reduce the level of reaction solvents below the 20% level. For instance, if the wash solvent has a relatively poor solubility for the product ester, or, if the product ester crystallizes easily, larger amounts of unremoved reaction solvent may be tolerated.

As has already been mentioned, a particular object of this invention is to remove the fluxing agents from the polyhydric alcohol ester following the distillation process described in my United States Patent No. 3,141,013. Since that process will normally remove substantially all of the relatively volatile reaction solvents, there would normally be little need for concern as to the amounts of reaction solvent which may be present. On the other hand, if the ester product is worked up by other methods, which may not necessarily completely remove the reaction solvent, some attention should be given to this problem.

Generally, the ester product should also not contain more than about 50% fluxing agent, based on the weight of the ester product because large amounts of fluxing agent tend to make the separation of the ester product and wash solvent difficult. If large amounts of wash solvent are employed, and/or low separation temperatures are employed, esters containing up to about 50% fluxing agent, or in some instances possibly more, may be processed satisfactorily. If lower amounts of fluxing agents are used or higher separation temperatures, it is generally preferred to limit the amount of fluxing agent to about 20% to 30%. The factors of separation temperature and ratio of wash solvent to ester product are discussed in more detail below.

Wash solvents which may be employed in the present invention are the alkane hydrocarbons boiling between about −45° and +115° C. at atmospheric pressure. This group includes propane, butanes, pentanes, hexanes, heptanes and some of octanes. While a number of these are commercially available as pure compounds, it is more common commercially to market these solvents as "petroleum ether." The petroleum ethers are derived from petroleum and include mixtures of several of the foregoing. The higher boiling ethers may also possibly contain $C_8$–$C_{10}$ hydrocarbons and still meet the suggested maximum boiling point mentioned above.

It will be obvious that solvents such as propane and butane cannot be used under atmospheric pressure at ambient temperatures. If such solvents are used, it will be necessary to carry out the washing process under refrigeration and/or super-atmospheric pressures.

It is contemplated that the wash solvent according to this invention will consist essentially of a volatile alkane, i.e. the solvent will be free of materials which would interfere with the effectiveness of the wash solvent to remove the fluxing agents or not to dissolve excessive amounts of ester product. As disclosed in my copending application Ser. No. 382,391, filed July 13, 1964 (concurrently herewith), certain volatile ketone, alcohol, ester and ether solvents are also useful as wash solvents to separate many of the fluxing agents and ester products mentioned herein. Obviously, such esters can be purified by the use of either the wash solvents mentioned herein or a wash solvent consisting essentially of a volatile oxygenated hydrocarbon or combination thereof. This would constitute either the successive or simultaneous practice of the invention claimed herein and the invention claimed in my aforementioned copending application. Where the presence of an extraneous solvent, such as another wash solvent, will not have a substantial adverse effect on the relative solubilities of the ester product and the fluxing agent in the volatile hydrocarbons, the phrase "consisting essentially of" as used herein and in the appended claims contemplates that the invention claimed in this application may be practiced simultaneously with the invention disclosed and claimed in said copending application by the use of a wash solvent consisting essentially of a volatile alkane in conjunction with a wash solvent consisting essentially of a volatile oxygenated organic solvent, either concurrently or successively.

In the practice of this invention, the ester product containing a fluxing agent is dispersed in a wash solvent. The method or time of adding the wash solvent is not critical. However, the wash solvents as described above are normally volatile (and, as noted, in the case of propane or butane, must be employed under refrigeration and/or pressure to obtain a liquid). Accordingly, if the polyhydric alcohol ester is worked up by a method including a distillation step, the wash solvent should normally not be added until after distillation has been completed. Thus, for instance, as applied to the purification of the product of the process disclosed and claimed in my United States Patent No. 3,141,013, the volatile wash solvent will be added after the fluxing process has been completed.

Generally, any washing temperature below the boiling point of the wash solvent may be employed. Heating of the solvent is not required. However, warming the solvent-ester mass during the agitation step may be desirable.

This will impart greater fluidity to the reaction mass and thereby render the dispersion more effective.

Depending on the ester product, the wash solvent and the relative proportions thereof, and the temperature at which dispersion takes place, partial or complete solution or colloidal dispersion of the ester in the wash solvent may occur. Such a result will lead to particularly effective washing. However, in this event subsequent cooling will be required to separate the washed ester from the wash solvent.

To disperse the ester effectively in the wash solvent, it is preferred to agitate the mass. The agitation step is continued until the ester product has been thoroughly contacted with the wash solvent. Generally, a more or less uniform mass will be obtained. If the ester product has been prepared by the fluxing process, or by any other process resulting in a relatively dry mass, it may be desirable to break up the product so that the largest lumps are not more than about ½" in diameter before adding it to the wash solvent to promote more rapid dispersion washing of the ester. Thereafter, the wash solvent is added and the mixture agitated. Agitation may continue from less than ten minutes to more than an hour, although this will vary widely depending upon the initial condition of the mass before the wash solvent has been added, the temperature of agitation and the equipment used.

After the wash solvent and polyhydric alcohol ester have been thoroughly contacted with each other, the mixture is separated into a solvent-rich phase and a product-rich phase and the solvent-rich phase is removed. The solvent-rich phase will normally have a density which is less than the product-rich phase, and will be a relatively clear supernatant liquid.

The product-rich phase is, on the other hand, relatively solid. By referring to the product-rich "phase," it is not intended to imply that the ester product is necessarily dissolved or colloidally dispersed in the wash solvent. Reference is merely to the fact that the solid, particulate product will separate under the influence of gravitational or like forces into a separate cake, paste or sediment as a solid or semi-solid phase which generally contains some of the wash solvent dispersed therein.

To obtain adequate phase separation, it may be helpful to cool the ester-wash solvent mixture. This is discussed more completely below.

Depending on the means of separation, the product-rich phase may range from a hard wax-like solid to a pasty mass. In a few instances a relatively crystalline solid may be obtained. The most convenient method of separating the solvent from the product is sedimentation, such as by simple settling or by centrifuging. Theoretically, filtration might be used. However, experience has shown that the polyhydric alcohol product commonly has a semiplastic character which renders filtration an impractical method of separation in most cases.

After the mixture of ester product and wash solvent has separated into two phases, the solvent-rich phase is removed. The solvents contained in this phase are subsequently recovered by fractional distillation. The wash solvent thus recovered may be reused in the washing processes already described. The fluxing agent solvent will also be recovered with the wash solvent, and the fluxing agent thus recovered may likewise be employed again in the processing of the polyhydric alcohol ester product.

The product-rich phase may contain greater or lesser amounts of wash solvent depending upon the efficiency of the method of separating. The product is stripped to remove the wash solvent, which wash solvent is recycled to the process. Stripping of the polyhydric alcohol ester product may be carried out in an agitated vessel, such as a Sigma-blade mixer, to prevent caking of the product as the solvent is removed. Stripping may be continued until the temperature is in excess of around 100° C., and may be under a vacuum which is as low as may be practically obtained with the vacuum equipment available. This will permit the recovery of the greatest amount of wash solvent, and yield an ester product containing the highest possible percentages of solvents. To avoid degradation of the product, stripping temperature should not normally exceed about 140° C.

It is not necessary, however, that the product be stripped following removal of the solvent phase. It is contemplated, for instance, that mixtures of polyhydric alcohol and wash solvent in the form of a paste may be employed commercially because such materials can be readily handled. In the event that it is contemplated to employ the ester product as a paste, it is obvious that the wash solvent selected should be one which is compatible with the subsequent use to be made of the ester product.

As already mentioned, the ratio of wash solvent to ester should be between about 0.8/1 and 10/1. In selecting a suitable ratio, the solubility of the ester product in the wash solvent should be considered. Some of the wash solvents mentioned above tend to solubilize or to disperse the ester product. If a good solvent is employed, to prevent excessive solubilization of the ester product, and the concomitant excessively large proportions of ester which would dissolve into the solvent phase, it is normally preferred to avoid a high ratio of solvent to ester. On the other hand, if the wash solvent is one which has already a very low solubility for the ester product, it may be preferred to employ as high a ratio as possible in order to obtain the most effective washing of the fluxing agent remaining in the polyhydric alcohol ester.

The amounts of reaction solvent and fluxing agents present will also affect the solubility of the ester product in the wash solvent. If large quantities of such solvents are present, a larger proportion of wash solvent will be required to obtain a good recovery of the ester product in the product-rich phase, and to obtain a product-rich phase having a reduced content of fluxing agents.

In some cases, i.e. where the fluxing agent has been stripped to a low value, it may be desirable to use a ratio of wash solvent to ester of as little as 0.8/1 to 1/1. Such ratios, however, tend to result in relatively heavy masses of wash solvent and ester. This renders mixing of the mixture more difficult. It is preferred to use a wash solvent to ester ratio between about 1.5/1 and 5/1.

While the washing step itself may be carried out at any convenient temperature, it is preferred that the mass not be excessively warm when the separation is made. To this end, the wash solvent-ester mass may be chilled before separation to a temperature below around 30° C. However, for maximum product recovery, lower temperatures are preferred.

As mentioned, if the ester product contains a large amount of fluxing agent it will be particularly important to use lower separation temperatures for optimum efficiency. This is also particularly important if smaller ratios of wash solvent to ester are used.

The washing process of the present invention may be conveniently carried out batchwise (and is thus illustrated in the examples below). However, it will be recognized that this invention is not so limited. Thus, for instance, continuous washing equipment may be provided. More importantly, the wash may also be carried out by countercurrent extraction such as by multi-stage equipment. While the use of a staged countercurrent process will necessarily require the use of more complex and expensive equipment than would a simple batchwise process, it is possible to obtain much more efficient separation in this manner.

For a better understanding of this invention, reference may be had to the following examples.

Example 1

A sucrose monotallowate was prepared in accordance with the process described generally in my U.S. Patent No. 3,141,012. After the transesterification reaction had been completed, the mass was neutralized by the addition of citric acid and unreacted sucrose was precipitated by the addition of a secondary solvent. The mother liquor recovered containing dissolved sucrose monotallowate was evaporated to substantial dryness.

Thereafter propylene glycol diacetate was added as a fluxing agent, and stripping of the ester product was continued. The final product thereby obtained contained about 0.02% dimethyl formamide (the primary reaction solvent) and about 4 to 5% propylene glycol diacetate. The balance was solids plus a small amount of water. The solids were largely, i.e. in the order of 70%, mono-ester. The balance of the solids was largely diesters and higher esters.

A sample of 325 lbs. of the foregoing ester was ground so that it passed through a 1/8" screen and was then added to a vessel containing about 1200 lbs. of a commercial hexane solvent. The solvent had a boiling range of 67°–69° C., a specific gravity of 0.6869, and an aniline point of 138° F. and a kauri-butanol number of 31.7.

The mixture was agitated in a Sigma-blade mixer until a slurry substantially free of lumps were obtained. The temperature during agitation was about 25° C.

Immediately after agitation, the mass was centrifuged, and about 500 lbs. of a cake containing 60% solids and 40% wash solvent was obtained. The mother liquor recovered from the centrifuge was fractionated. The hexane solvent fraction, which was substantially pure, was reusable as wash solvent. In addition, about 10 lbs. of a propylene glycol diacetate fraction were obtained which could be reused as a fluxing agent.

The cake obtained from the centrifuge was dried by heating it under vacuum in a Sigma-blade mixer. The final product contained about 1% propylene glycol diacetate and less than 50 p.p.m. of hexane.

The foregoing procedure may be used with the various polyhydric alcohol esters, fluxing agents, and wash solvents which have already been described in detail. Further specific illustrations are set forth in the following table. In each case, the product ester which may be purified, the fluxing agent impurity and the wash solvent are specified, as well as the ratio of wash solvent to ester product. The general procedure outlined in Example 1 may be followed.

fication reaction and containing no more than 2 oxygen atoms in addition to those in the carboxyl groups, said ester being admixed with not more than about 20% of a reaction solvent based on the weight of the polyhydric alcohol ester and up to about 50% based on the weight of the polyhydric alcohol ester, of at least one fluxing agent selected from the group of oxygenated polar organic solvents selected from the group consisting of (a) di-esters of aliphatic diols having 2 to 6 carbon atoms with the lower fatty acids which have from 2 to 4 carbon atoms in the molecule, (b) tri-esters of aliphatic triols having from 2 to 6 carbon atoms with the lower fatty acids which have from 2 to 4 carbon atoms in the molecule, (c) di-esters of aliphatic di-carboxylic acids having from 4 to 6 carbon atoms with lower monohydric primary and secondary aliphatic alcohols having from 1 to 4 carbon atoms, said esters having from 6 to 10 carbon atoms in the ester molecule, (d) aconitic acid completely esterified with methyl or ethyl alcohol, (e) esters of acetoacetic acid and levulinic acid with the primary and secondary aliphatic monohydric alcohols which have from 1 to 5 carbon atoms, the improvement comprising dispersing said ester in an amount of a wash solvent between about 0.8 and 20 times the weight of the polyhydric alcohol ester, said wash solvent consisting essentially of an alkane hydrocarbon solvent having a boiling point between about −45° C. and +115° C. at atmospheric pressure, thoroughly to contact said polyhydric alcohol ester with said wash solvent and to obtain thereby a washed mass, separating said washed mass into a solvent-rich phase comprising said fluxing agent and said wash solvent and a product-rich phase, removing at least a portion of said solvent-rich phase and recovering from said washed mass a purified polyhydric alcohol ester.

2. A process according to claim 1, wherein the ratio of said wash solvent to ester is between about 1.5/1 and 5/1 based on the weight of said ester.

3. The process of claim 1 wherein the wash solvent is an alkane hydrocarbon having from 4 to 7 carbon atoms.

| Ex. No. | Ester Product [1] | Fluxing Agent Impurity [2] | Wash Solvent [3] | Wash Solvent/ Ester Ratio | Separation Temperature, ° C. |
|---|---|---|---|---|---|
| 2 | Sorbitol palmitate [4] | Triacetin | Pentane | 3/1 | 10 |
| 3 | Sucrose oleate | Diethyl fumarate | do | 5/1 | 15 |
| 4 | Sucrose stearate | Triethyl ester of aconitic acid | Butane | 10/1 | 5 |
| 5 | Sucrose ester of hydrogenated tallow | Butyl levulinate | Hexane | 4/1 | 25 |
| 6 | Sucrose salicylate | Diethyl succinate | Heptane | 4/1 | 20 |
| 7 | Sorbitol salicylate [4] | Propylene glycol diacetate | do | 3/1 | 20 |
| 8 | Erythritol salicylate | Triacetin | do | 4/1 | 10 |
| 9 | Disucrose adipate | Propylene glycol dipropionate | Hexane | 4/1 | 20 |

[1] The product ester content of these preparations is more than 50% by weight monoesterified polyhydric alcohol, but substantial amounts of di- and poly-esterified polyhydric alcohol esters may be present.
[2] Generally between about 2% and 20% by weight.
[3] The wash solvents are commercial petroleum fractions, which have a narrow boiling range, and consist essentially of the alkane hydrocarbon named.
[4] Substantially free of sorbitans.

Although the invention has been described with reference to specific materials and procedures, it will be recognized that many modifications thereof are included within the scope of the appended claims, and that this invention is not limited to the specific compounds mentioned in the foregoing specification.

I claim:

1. In a process for refining polyhydric alcohol esters of solid polyhydric, aliphatic alcohols and carboxy acids, said esters having been synthesized by a transesterification reaction between a polyhydric alcohol and an ester reactant, said polyhydric alcohol containing from 4 to 18 carbon atoms and at least 4 hydroxy groups, and having a melting point of at least 85° C., and the acid moiety of said ester reactant containing from 4 to 32 carbon atoms, being free of groups which interfere with the transesteri- 4. A process according to claim 1 wherein said washed mass is separated into a solvent rich-phase and a product-rich phase at a temperature below about 30° C.

5. A process according to claim 1 wherein the oxygenated polar solvent is present in an amount not exceeding about 30% by weight based on the weight of the polyhydric alcohol ester.

6. A process according to claim 1 wherein the oxygenated polar solvent is propylene glycol diacetate and the polyhydric alcohol ester is sucrose monotallowate.

7. The process of claim 1 wherein the oxygenated polar solvent is triacetin and the polyhydroxy alcohol ester is sorbitol palmitate.

8. The process of claim 1 wherein the oxygenated polar solvent is diethylfumarate and the polyhydroxy alcohol ester is sucrose oleate.

9. The process of claim 1 wherein the oxygenated polar solvent is triethyl ester of the aconitic acid and the polyhydroxy alcohol ester is sucrose stearate.

10. The process of claim 1 wherein the oxygenated polar solvent is butyl levulinate and the polyhydroxy alcohol ester is sucrose ester of hydrogenated tallow.

11. The process of claim 1 wherein the oxygenated polar solvent is diethyl succinate and the polyhydroxy alcohol ester is sucrose salicylate.

12. The process of claim 1 wherein the oxygenated polar solvent is propylene glycol diacetate and the polyhydroxy alcohol ester is sorbitol salicylate.

13. The process of claim 1 wherein the oxygenated polar solvent is triacetin and the polyhydroxy alcohol ester is erythritol salicylate.

14. The process of claim 1 wherein the oxygenated polar solvent is propylene glycol diproprionate and the polyhydroxy alcohol ester is disucrose adipate.

15. Esters of solid polyhydric alcohols and polybasic acids, said polybasic acids being prepared by condensation of methyl esters of acids of the group consisting of maleic and fumaric acids with methyl esters of acids of the group consisting of oleic and linoleic acids.

References Cited

UNITED STATES PATENTS

| | | | |
|---|---|---|---|
| 2,628,249 | 2/1953 | Bruno | 260—234 |
| 2,700,022 | 1/1955 | Clayton et al. | 260—234 |
| 2,868,781 | 1/1959 | Gaertner et al. | 260—234 |
| 2,948,716 | 8/1960 | Davis | 260—234 |
| 2,954,372 | 9/1960 | Novak | 260—234 |
| 3,054,789 | 9/1962 | D'Amato | 260—234 |

H. A. FRENCH, *Primary Examiner.*

J. R. BROWN, *Assistant Examiner.*